United States Patent [19]
Boutni

[11] Patent Number: 4,906,689
[45] Date of Patent: Mar. 6, 1990

[54] LOW-GLOSS AROMATIC CARBONATE POLYMER BLEND

[75] Inventor: Omar M. Boutni, Mt. Vernon, Ind.

[73] Assignee: General Electric Company, Mt. Vernon, Ind.

[21] Appl. No.: 289,934

[22] Filed: Dec. 27, 1988

[51] Int. Cl.$^4$ .............................................. C08L 69/00
[52] U.S. Cl. ...................................... 525/67; 525/146
[58] Field of Search .......................... 525/67, 146, 468

[56] References Cited

U.S. PATENT DOCUMENTS

| | | | |
|---|---|---|---|
| 2,820,773 | 1/1958 | Childers | 525/262 |
| 4,526,926 | 7/1985 | Weber et al. | 525/67 |
| 4,742,104 | 5/1988 | Lindner et al. | 524/409 |

OTHER PUBLICATIONS

Chiang et al., "Properties of Polycarbonate/AcrylonitrileButadiene-Styrene Blends", Polym. Eng. & Sci. 27(9) 632-9 (1987).
Suarez et al., "Mechanical Properties of ABS/Polycarbonate Blends", J. Appl. Poly. Sci. 29 3253-9 (1984).
Deanin et al., "Polyblends of Polycarbonate with ABS," J. Elastomers and Plastics 18 42-49 (1986, Jan.).

Primary Examiner—Theodore E. Pertilla
Attorney, Agent, or Firm—Martin Baraneik; Joseph Eisele

[57] ABSTRACT

A low gloss thermoplastic blend is produced by blending an aromatic polycarbonate with a very high rubber ABS made by emulsion polymerization.

10 Claims, No Drawings

LOW-GLOSS AROMATIC CARBONATE POLYMER BLEND

BACKGROUND OF THE INVENTION

1. Field of the Invention

The invention is directed to blends of aromatic carbonate polymers with particular ABS compositions of very high rubber content made by emulsion polymerization, in particular to such blends with low gloss, good retention of physical properties and in particular retention of properties on heat aging.

2. Brief Description of the Prior Art

It has long been known that ABS thermoplastics can be blended with aromatic carbonate polymers, such as polycarbonates, to make useful thermoplastic blends with enhanced impact strength. A brief survey of such blends was given by Chiang et al. in Polymer Engineering and Science, 27 (9), 632-639 (May 1987) and by Suarez et al. J. Appl. Polymer Sci., 29, 3253 (1984). Chiang et al. describe the use of ABS having 32% rubber content.

However, to achieve commercially useful combinations of properties has required extensive experimentation and many such combinations are not useful, and the special advantages of particular ABS types have not been fully recognized. As shown by Chiang et al. (loc. cit.) the properties of polycarbonate-ABS blends are not obvious averages of the properties of the components. It has been especially difficult to achieve polycarbonate-ABS blends with good heat aging properties. It has also been difficult to achieve such blends with good weld line strength such that molded objects made using molds with multiple points of entry are free of weakness at the region where the molten polymer streams join in the mold. Another major shortcoming of polycarbonate-ABS blends has been that it has been difficult to achieve low-gloss properties without loss of physical properties. This is not surprising because the low-gloss property arises from formation of domains or phases of optical dimensions, and the requirements for the separation of the components to form such phases tends to work against optimal strength properties and in the extreme can even aggravate delamination and provoke weak weld lines in molded articles.

A matte or non-glossy surface is often preferable for products such as housings for computer terminals, typewriters, miscellaneous electrical appliances and automotive parts, but these uses are equally demanding of good thermomechanical properties, good heat aging and strong weld lines.

The present invention provides low-glass aromatic carbonate polymer-ABS blends with good impact strength, good heat aging properties, and strong weld lines. The simultaneous achievement of all these desirable properties is accomplished by the use of certain specific types of ABS at a certain percentage by weight, whereas in general by use of other types of ABS, or other percentages, these properties will not be achieved all at the same time.

SUMMARY OF THE INVENTION

Blends of aromatic carbonate polymers, preferably polycarbonates, with high-rubber ABS compositions in the range of about 70 to 95% (all percentages herein are by weight) carbonate polymer and about 5 to 30% of very high-rubber ABS having at least 34%, preferably at least 40% rubber content and made by emulsion polymerization afford low gloss with good impact, heat aging, and weld line strength properties.

The simultaneous criticality of the rubber content, the method of manufacture of the ABS, and the percentage used in the blend to achieve gloss reduction is surprising and unexpected.

DETAILED DESCRIPTION OF THE INVENTION

The blends of the invention comprise:

(a) at least one aromatic carbonate polymer, preferably a polycarbonate, in a weight proportion range of about 65% to about 95%, (preferably about 70% to about 90%); and (b) at least one very high rubber ABS polymer in a weight proportion range of about 5 to about 35% (preferably about 10 to about 30%), said ABS polymer having at least 34% (preferably at least 40%) rubber content and made by emulsion polymerization.

The aromatic carbonate polymers useful as component (a) include polycarbonates as well as polyester-carbonates. The method of preparation of polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

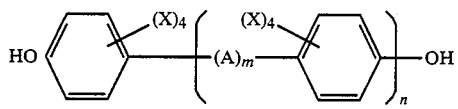

wherein A is a divalent hydrocarbon radical containing from 1 to about 15 carbon atoms; a substituted divalent hydrocarbon radical containing from 1 to about 15 carbon atoms and substituent groups such as halogen;

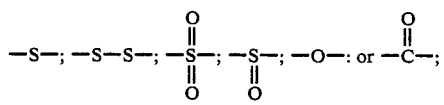

wherein each X is independently selected from the group consisting of hydrogen, halogen, and a monovalent hydrocarbon radical such as an alkyl group of from 1 to about 8 carbon atoms, an aryl group of from 6-18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the practice of the present invention are bis-phenols such as (4-hydroxyphenyl)methane, 2,2-bis(4-hydroxyphenyl)propane (also known as bis-phenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'- dihydroxydiphenyl, 3,3'-dichloro-4,4'-dihydroxydiphenyl; dihydroxyaryl sulfones such as bis(4hydroxyphenyl) sulfone, bis (3,5-dimethyl-4hydroxyphenyl) sulfon, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bis-chloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The aromatic carbonate polymers suitable for use as component (a) of the compositions of the invention include polyester-carbonates, also known as copolyester-polycarbonates, i.e., resins which contain, in addition to recurring polycarbonate chain units of the formula:

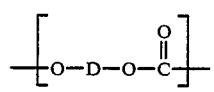

wherein D is a divalent aromatic radical of the dihydric phenol employed in the polymerization reaction, repeating or recurring carboxylate units, for example of the formula:

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

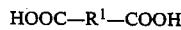

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

—E— wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

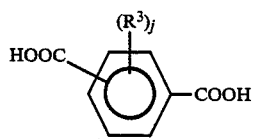

(IV)

wherein j is a positive whole integer having a value of from 0 to 4 inclusive; and each $R^3$ is independently selected from the group consisting of alkyl radicals, preferably lower alkyl (1 to about 6 C atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of 0.3 to 1.0 deciliters per gram measured in methylene chloride at 25° C.

The ABS polymer of very high rubber content for use as component (b) must be emulsion polymers having at least 34% and preferably above about 40% rubber content, up to about 55% rubber content, which distinguishes them from the ABS polymers used hitherto in polyblends with polycarbonates. It has been hitherto unrecognized that such very high rubber ABS affords the unique combination of properties provided by my present invention. As mentioned, (b) must be an ABS made by emulsion polymerization, rather than by bulk or suspension polymerization which are processes commonly used to manufacture commercial ABS; an ABS made by emulsion polymerization is exemplified in U.S. Pat. No. 2,820,773 (1958) which is incorporated herein by reference thereto. ABS resins made by emulsion polymerization and having very high rubber content are commercially available, for example the following: Novalar ® made by Nova Polymers, Inc.: a powdered ABS having about 50% butadiene rubber content, a density of 1.04 and a melt flow index of 4.0; and Blendex ® 301 made by Borg-Warner Chemicals, Inc.: a powdered ABS having 34% polybutadiene rubber content, a specific gravity of 0.99 by ASTM D-792 Method A-1, and a heat deflection temperature of 172° F. at 10 mil deflection and 1.81 MPa (annealed) by ASTM D-648. These two ABS products are preferred for use in the blends of the invention, although any very high rubber emulsion-polymerized ABS is usable.

EXAMPLES 1-4

Samples were prepared by melt blending the compositions indicated in the table below in a twin screw extruder at 220°-270° C. and 100-200 rpm. The blended and extruded material was then pelletized, dried and injection molded at about 240° C. to prepare test specimens. The gloss was measured by ASTM test method D-1003 at 60° C. using a Gardner gloss meter. Other physical properties were measured on injection molded samples using the following ASTM test methods: Tensile properties, D638; impact by notched Izod, D256; heat deflection temperature (DTUL), D648-56 at 18.6 Kg/cm²; flexural properties, D790, Weldline strength, D256.

| Example No.: | 1 | 2 | 3 | 4 |
| --- | --- | --- | --- | --- |
| Composition (wt. %): | | | | |

| Example No.: | 1 | 2 | 3 | 4 |
|---|---|---|---|---|
| Polycarbonate (note 1) | 100 | 90 | 80 | 70 |
| Novalar ® ABS (note 2) | — | 10 | 20 | 30 |
| Properties: | | | | |
| 60° gloss | >100 | 75 | 35 | 25 |
| Tensile yield, (MPa) | 63.3 | 57.1 | 56.9 | 46.1 |
| Tensile break, (MPa) | 75.0 | 73.0 | 66.1 | 55.1 |
| Elongation, % | 93 | 107 | 108 | 96 |
| Flex. Yield, (MPa) | 99.8 | 66.7 | 93.6 | 93.6 |
| 2.75 mm N. Izod (J/m) | 838 | 689 | 592 | 560 |
| same after 125° C./24 hrs | 96 | 667 | 582 | 550 |
| 6.35 mm N. Izod (J/m) | 117 | 619 | 550 | 491 |
| DTUL (°C.) @ 1.81 MPa | 124 | 124 | 119 | 108 |
| Weldline strength (J) | 50.5 | 37.5 | 30.6 | 22.9 |

Notes to table:
1. Lexan ® 125; a polycarbonate made from bisphenol A and phosgene by General Electric Co..
2. Emulsion polymerized powdered ABS with 41% rubber content, from Nova Polymers.

EXAMPLES 5-8

The use of an alternative very high rubber ABS and an alternative polycarbonate are shown in the following examples, in which blending was done in a twin screw extruder at 220°-270° and 100-200 rpm. Preparation of samples and testing were done as in the foregoing examples. The formulations and results are as follows:

| Example No.: | 5 | 6 | 7 | 8 |
|---|---|---|---|---|
| Composition (wt. %): | | | | |
| Polycarbonate (note 1) | 90 | 80 | 70 | 60 |
| Blendex ® 301 (note 2) | 10 | 20 | 30 | 40 |
| Properties: | | | | |
| 60° gloss | 77.4 | 53.0 | 34.6 | 51.6 |
| Tensile yield, (MPa) | 57134 | 50251 | 44744 | 38549 |
| Tensile break, (MPa) | 59188 | 53693 | 44056 | 36484 |
| Elongation, (%) | 95 | 89 | 74 | 59 |
| Flex. Yield, (MPa) | 85.4 | 75.7 | 66.8 | 57.8 |
| 3.175 mm N. Izod (J/m) | 603 | 475 | 454 | 363 |
| 6.35 mm N. Izod (J/m) | 480 | 400 | 379 | 299 |
| DTUL at 1.81 MPa °F. | 246 | 257 | 220 | 213 |

Notes to table:
1. Lexan ® 145; a polycarbonate made from bisphenol A and phosgene by General Electric Co;
2. A powdered ABS having 34% rubber content, made by Borg-Warner Chemical Co., with a heat deflection temperature of 77° F. (10 mil, 1.81 MPa, annealed) by ASTM D-64.

By way of comparison, a commercial polycarbonate-ABS blend (Pulse 830, a product of Dow Chemical Co.) contains about 35% ABS of 25% rubber content, believed to be made by bulk polymerization, and has a 60° gloss of 70-80.

Obviously, other modifications and variations of the invention are possible in the light of these teachings. It is to be understood that changes may be made in the particular embodiments of the invention described which are within the full intended scope of the invention as defined by the appended claims.

What is claimed is:

1. A low-gloss thermoplastic blend the thermoplastic components of which consist essentially of:
   (a) from about 65 to about 95 percent by weight of an aromatic carbonate polymer; and
   (b) from about 5 to about 35 percent by weight of at least one very high rubber emulsion-polymerized ABS (acrylonitrile/butadiene/styrene) said rubber being from about 34 to about 55 weight percent of said ABS.

2. A low-gloss thermoplastic blend the thermoplastic components of which consist essentially of:
   (a) from about 70 to about 90 percent by weight of an aromatic carbonate polymer; and
   (b) from about 10 to about 30 percent by weight of at least one very high rubber emulsion-polymerized ABS polymer, said rubber being from about 34 to about 55 weight percent of said ABS.

3. A low-gloss thermoplastic blend as defined in claim 1 wherein said aromatic carbonate polymer is a polycarbonate.

4. A low-gloss thermoplastic blend as defined in claim 3 wherein said polycarbonate is derived principally from bisphenol A and phosgene.

5. A low-gloss thermoplastic blend as defined in claim 1 where said ABS has at least 34 weight percent rubber content.

6. A low-gloss thermoplastic blend as defined in claim 1 where said ABS has at least 40 weight percent rubber content.

7. A low-gloss thermoplastic blend as set forth in claim 6 wherein said ABS is a powdered ABS made by emulsion polymerization and having about 41% butadiene rubber content.

8. A low-gloss thermoplastic blend as set forth in claim 5 wherein said ABS is a powdered ABS made by emulsion polymerization and having at least 34% polybutadiene rubber content.

9. A thermoplastic blend having a gloss as measured at 60? by ASTM test method D-1003 of equal or less than 35, the thermoplastic components of which consist essentially of:
   (a) from less than about 90 percent to about 70 percent of an aromatic polycarbonate; and
   (b) about 10 percent by weight to about 30 percent by weight of a powdered ABS having about 41 to about 55 percent butadiene rubber content and made by emulsion polymerization.

10. A thermoplastic blend defined in claim 9 wherein (a) is present at about 70 percent; and (b) is present at about 30 percent, and said ABs has about 34 percent rubber content.

* * * * *

UNITED STATES PATENT AND TRADEMARK OFFICE
CERTIFICATE OF CORRECTION

PATENT NO. : 4,906,689

DATED : March 6, 1990

INVENTOR(S) : Omar Mohamed Boutni

It is certified that error appears in the above-identified patent and that said Letters Patent is hereby corrected as shown below:

Column 3, line 37, delete "sulfon" and add "sulfone"

Column 8, line 42, delete "60?" and add "60°"

Column 8, line 53, delete "ABs" and add "ABS"

Signed and Sealed this

Nineteenth Day of February, 1991

Attest:

HARRY F. MANBECK, JR.

Attesting Officer

Commissioner of Patents and Trademarks